United States Patent [19]
Cranor

[11] Patent Number: 6,126,871
[45] Date of Patent: Oct. 3, 2000

[54] HIGH OUTPUT CHEMILUMINESCENT LIGHT FORMULATIONS

[75] Inventor: Earl Cranor, Longmeadow, Mass.

[73] Assignee: Omniglow Corporation, West Springfield, Mass.

[21] Appl. No.: 09/271,019

[22] Filed: Mar. 17, 1999

[51] Int. Cl.$^7$ ...................................................... C09K 3/00
[52] U.S. Cl. ............................................. 252/700; 362/34
[58] Field of Search ................................ 252/700; 362/34

[56] References Cited

U.S. PATENT DOCUMENTS

| | | | |
|---|---|---|---|
| 3,749,679 | 7/1973 | Rauhut | 252/700 |
| 3,775,336 | 11/1973 | Bollyky | 252/700 |
| 4,076,645 | 2/1978 | Vega | 252/700 |
| 4,313,843 | 2/1982 | Bollyky et al. | 252/700 |
| 4,508,642 | 4/1985 | World | 252/700 |
| 4,626,383 | 12/1986 | Richter et al. | 252/700 |
| 4,698,183 | 10/1987 | Koroscil | 252/700 |
| 5,281,367 | 1/1994 | Schleck et al. | 252/700 |

FOREIGN PATENT DOCUMENTS

94/19421  9/1994  WIPO.

Primary Examiner—Philip Tucker
Attorney, Agent, or Firm—McHale & Slavin

[57] ABSTRACT

The chemiluminescent light system of the present invention utilizes esters of sufficiently high purity, e.g. triethyl citrate or dimethyl phthalate as the activator solvent to provide enhancements over the prior art chemiluminescent systems. These enhancements are manifested in terms of the rate of light production, e.g. the "flatness" of the light output profile, and the total light output achieved during a device's useful life. In a preferred embodiment, the unreacted acid content of esterified solutions, useful as activators in chemiluminescent systems, should be no greater than 0.05 weight percent. The activator solutions of the instant invention also provide triethyl citrates of sufficient purity, in terms of the absence of carbon double-bond compounds, to provide enhanced light generation and increased total light output, as compared to prior art chemiluminescent systems. This effect is further enhanced by inclusion of a catalyst system containing an equimolar mixture of sodium perborate and salicylic acid in either a citrate or phthalate based system. In a particular embodiment, the chemical light system of the present invention provides enhanced generation of light in a phthalate-free system.

50 Claims, No Drawings

6,126,871

HIGH OUTPUT CHEMILUMINESCENT LIGHT FORMULATIONS

FIELD OF THE INVENTION

This invention relates to new solvent systems for peroxyoxalate chemiluminescent systems. More particularly, this invention relates to chemiluminescent compositions wherein the activator utilizes a triethyl citrate solvent. Most particularly, this invention relates to chemiluminescent systems having improved light output due to refinements in the activator solvent and catalyst systems.

BACKGROUND OF THE INVENTION

Chemiluminescence may be simply defined as the chemical production of light. In the literature it is often confused with fluorescence. The difference between these two phenomena lies in the source of the energy which promotes molecules to an excited state. In chemiluminescence this source is the non-radiative energy yielded as the result of a chemical reaction. The subsequent decay of molecules from the excited state back to the ground state is accompanied by emission of light, which is called luminescence. In contrast, in fluorescence, incident radiation is the source of the energy which promotes molecules to an excited state.

The history of chemiluminescence, especially that occurring in the non-aqueous phase, is remarkably short. The important aqueous chemiluminescent substances luminal and lucigenin were discovered in 1928 and 1935, respectively. A series of organic soluble chemiluminescent materials were developed in the early 1960's based upon a study of the luminescent reactions of a number of oxalate compounds. A typical organic system useful for chemiluminescence was disclosed by Bollyky et al., U.S. Pat. No. 3,597,362 and claimed to exhibit a quantum efficiency of about 23% compared with about 3% for the best known available aqueous systems.

The two-part peroxy-oxalate chemical lighting systems known in the prior art provide practical chemical lighting systems that are useful for a variety of applications. These systems are efficient producers of chemiluminescent light, are storage stable, simple to operate, safe to use, and are capable of being formulated to meet a variety of brightness, color and lifetime requirements. Examples of these prior art chemiluminescent lighting systems can be found in one or more of the following U.S. Pat. Nos. 3,749,679; 3,391,069; 3,974,368; 3,557,233; 3,597,362; 3,775,336; and 3,888,786, which are incorporated herein by reference.

The production of devices capable of emitting light through chemical means is well-known in the art. LIGHTSTICKS, for example, are taught in U.S. Pat. No. 3,539,794, while other configurations have also been the subject of many U.S. Pat. Nos. e.g. 3,749,620; 3,808,414; 3,893,938; 4,635,166; 4,814,949 and 5,121,302.

Typically, these devices comprise a particular type of packaging whereby the two components of the light producing chemical reaction are kept separate until contacting of the components is desired, at which time the two components are mixed to produce chemical light by reaction. Generally, the two components employed in a chemiluminescent light device are (1) a component containing a chemiluminescent compound and (2) a component containing an activator compound.

The two component systems generally contain a chemiluminescent component that is a liquid phase oxalate ester which is termed the "oxalate component" and comprises an oxalate ester and a solvent; and an "activator component" which contains hydrogen peroxide and a solvent.

The most commonly used activator solvents are phthalate compounds such as dimethyl phthalate and dioctyl phthalate. See e.g. U.S. Pat. Nos. 4,717,511; 4,017,415; 4,698,183 and 4,508,642. Other useful activator solvents are water, alcohols, ethers such as diethyl ether, diamyl ether, tetrahydrofuran, dioxane, dibutyldiethyleneglycol, perfluoropropylether, and 1,2-dimethoxyethane and esters such as ethyl acetate, ethyl benzoate and propyl formate.

In addition to the oxalate component and activator component an efficient fluorescer compound is included in one of the component solutions and any necessary catalyst for enhancing intensity and lifetime control must also be contained in one of the component solutions.

The oxalate component provides an oxalate ester/solvent combination that permits suitable ester solubility and also permits storage stability. The peroxide component provides a hydrogen peroxide/solvent combination that permits suitable hydrogen peroxide solubility and also permits storage stability. It is permissible that the solvents for the two components be different provided that they are miscible. It is thus necessary that at least one of the solvents solubilize the fluorescer material and at least one solvent should solubilize an efficient catalyst material. The constituents are optimally selected so as to accommodate their formulation into two reactive components which separately have extended storage stabilities and which generate useful life when combined.

Selection of solvents for each component is therefore critical in terms of safety as well as in terms of performance and storage stability. The constituents must be selected so as to maximize light output, provide products exhibiting low toxicity, low freezing point and high flash point thus providing for safe operation over an extended range of temperature. These properties are determined to a large extent by the solvent or solvents which are selected for the two reactive components in that the solvent may constitute substantially more then 90 percent of the combined system. In this regard, the present applicants have discovered that the use of triethyl citrate as an activator solvent unexpectedly provides increased overall light output and a "flatter" production of light during the lifetime of the device. Additionally, it has been discovered that inclusion of a sodium perborate/salicylic acid catalyst improves the characteristics of chemiluminescent systems in general, and particularly improves those utilizing a triethyl citrate activator solvent.

Prior Patents:

U.S. Pat. No. 4,508,642 discloses a method of obtaining greater lifetime duration from chemiluminescent systems by utilizing ditridecyl phthalate (DTDP) or ditridecyladipate (DTDA) in liquid chemiluminescent systems based upon a chemical reaction involving an ester of oxalic acid mixed with an organic fluorescer, hydrogen peroxide, and a catalyst. Admixing of the DTDP or DTDA in the chemiluminescent system produces a greater light output coupled with a greater lifespan for said chemiluminescent system.

WO 94/19421 discloses a phthalate free chemiluminescent activator solution. The International application describes an activator component solution comprising a peroxide compound in a solvent which is selected from the group consisting of acetyl trialkyl citrates, trialkyl citrates, N-alkyl-arylenesulfonamides, dialkyl adipates, pentaerythritol tetrabenzoate, glyceryl tribenzoate and mixtures thereof. The application further discloses a catalyst system and a chemiluminescent component comprising an oxalic acid ester and an organic fluorescer.

SUMMARY OF THE INVENTION

The present invention utilizes triethyl citrate as the activator solvent in a chemiluminescent system. Triethyl citrate provides enhancements to the prior art chemiluminescent systems in terms of the rate of light production and the total light output achieved during a device's useful life. Prior art chemiluminescent light systems have utilized ester based activator solvents which, due to incomplete esterification of the organic acid/alcohol precursors, result in mixed ester solutions containing unreacted acids. Because chemical light systems are catalyzed by weak bases, one must guard against the inclusion of unreacted acids that will buffer the basic catalyst, rendering it ineffective. Citrate esters are made by reacting Citric Acid with an alcohol in the presence of a catalyst. Strong acids, e.g. sulfuric acid or titanium based compounds are known to be suitable catalysts in the manufacture of citrate esters. It is desirable that the acid content of ester solutions, useful as activators in chemiluminescent systems, be no greater than 0.05 weight percent. The activator solutions of the present invention must therefore be well esterified in order to maintain maximum function and light output from the chemiluminescent system of which they are a part. In addition to merely being well esterified, the ester solutions useful in chemiluminescent light systems, e.g. triethyl citrates and dimethyl phthalates, must also be of very high purity. Purity of the final ester is determined, initially, by the success of the reaction, i.e. the process yield. Poor yields result in unreacted acid, other esters (mixed esters) and other compounds. A measure of the success of the reaction is a test for remaining acid, e.g. citric acid or phthalic acid. Esters of very high purity are characterized as having residual acid levels of 0.05 weight percent or less, and contain no other products or unreacted acids. Esters, such as Triethyl citrates and dimethyl phthalates manifesting these characteristics are sufficiently pure so as to provide enhanced generation, e.g. a flatter light output profile and greater total light output. One example of such triethyl citrates are those formed from organic titanates, for example those produced in accordance with the methods taught by U.S. Pat. No. 5,055,609 assigned to the Morflex Corp., the contents of which are herein incorporated by reference. Great care must be exercised in order to maintain sufficiently high purity levels. If an acid catalyst is used it must be removed. A common removal method is via neutralization with a base. This results in a salt, which is removed via an aqueous wash and separation of the aqueous layer, inclusive of the salt, from the organic layer. Not all the water can be removed, thus some salt will remain behind with this water. If the salt is ionic in nature, it can and will effect the chemiluminescent reaction. The mechanism of peroxyoxalate chemiluminescence requires catalysis by weak bases in very low concentrations. A remaining solvent based salt that is acidic in nature and has a pK value higher than that of the catalyst used for chemical light will have the effect of neutralizing and/or buffering the chemical light system. If a titanium based catalyst is used, other compounds including those with double bonds, e.g. aconitates, can be formed. These will be highly reactive with hydrogen peroxide. Therefore, low levels of these impurities are desired to minimize the adverse effects that they have on peroxide levels.

While not wishing to be bound by any particular mechanism, it is theorized that the increase in overall reaction efficiency may be due to the absence of certain double bond compounds, such as aconitates, which are highly reactive with peroxides.

The triethyl citrate based activator chemiluminescent systems of the instant invention, catalyzed with either a salicylate or perborate/acid mixture are characterized by a "flatter" light output curve than any of a number of equivalent chemiluminescent system having a dimethyl phthalate based activator system. By "flatter" it is meant that the initial light output of the system is lower and the decrease in intensity is less steep. Thus, the amount of light emitted as a function of time is more stable and consistent during the lifetime of the reaction. This also results in a greater total light output (TLOP) as compared to the dimethyl phthalate based activator system. For applications such as safety lighting and the commercial fishing industry, a chemical light which glows for a longer period of time with a fairly constant intensity represents a significant improvement.

It has further been discovered that the light intensity of both the triethyl citrate based activator chemiluminescent system of the present invention and the prior art dimethyl phthalate based activator systems can be further intensified by the inclusion of a new catalyst system. It has now been discovered that the use of an equimolar combination of sodium perborate and salicylic acid in place of the more traditional salicylate catalysts results in both a flatter light output and a greater overall light output as compared to prior art systems.

Thus, it is an objective of the present invention to teach a chemiluminescent system utilizing a triethyl citrate activator solvent.

It is a further objective of the invention to teach a chemiluminescent system utilizing a sodium perborate/salicylic acid catalyst.

It is yet a further objective of the invention to teach chemical lighting systems having a flatter light output profile.

It is still another objective of the invention to provide a chemical lighting system having increased total light output.

It is yet another objective of the instant invention to teach chemical light systems having a flatter profile with all possible oxalate solvents and including a triethyl citrate activator and a salicylate catalyst.

It is a still further objective of the instant invention to teach chemical light systems having a flatter light output profile with all possible oxalate solvents, a phthalate activator solvent and a sodium perborate/salicylic acid catalyst system.

It is still an additional objective of the instant invention to teach chemical light systems having a flatter light output profile with all possible oxalate solvents, a triethyl citrate activator solvent and a sodium perborate/salicylic acid catalyst system.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof. Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

In accordance with the present invention, an activator component is provided which contains a peroxide or a peroxide producing constituent incorporated within a citrate based activator solvent. The citrate based solvents, which yield enhanced total light output and a flatter light output profile, may be selected from triethyl citrates of varying purity, especially those having less than or equal to 0.05 weight percent unreacted acid and those prepared from organic titanates and being substantially free of carbon double-bond substituents, such as for example aconitates.

An oxalate solvent system is further provided which may be phthalate or benzoate based. These solvents may be selected from $C_2$–$C_4$ alkyl benzoates, and in a preferred embodiment are butyl benzoate, dibutyl phthalate or the like.

A new catalyst system, utilized to further enhance the flatter light output profile and total light output, includes a combination of sodium perborate and salicylic acid in equimolar proportions. This new catalyst system demonstrates a flatter light output profile when used in citrate or phthalate based systems, e.g when the activator solvent is triethyl citrate or dimethyl phthalate of sufficient purity as described above.

Definitions

CHEMILUMINESCENCE as employed herein, is defined as the generation of electromagnetic radiation between about 300 and 1200 nanometers by means of a chemical reaction.

FLUORESCER COMPOUNDS for use in the present invention are those which have spectral emission falling between 300 and 1200 nanometers and which are at least partially soluble in the diluent employed. Effective amounts for the fluorescer concentration may range from 0.01 weight percent–0.1 weight percent.

DILUENT as used herein, is defined as a solvent, or vehicle, for the compound oxalate and activator components as well as the associated catalyst compounds, fluorescer compounds, etc.

PEROXIDE COMPONENT as used herein, means a solution of a hydrogen peroxide compound, a hydroperoxide compound, or a peroxide compound in a suitable diluent.

HYDROGEN PEROXIDE COMPOUND includes (1) hydrogen peroxide and (2) hydrogen peroxide-producing compounds.

Effective amounts for the hydrogen peroxide concentration in the peroxide component may range from about $1\times10^{-5}$ to about $1\times10^5$ M. Preferably, the concentration ranges from about 1M to about 2M.

The lifetime and intensity of the chemiluminescent light emitted can be regulated by the use of certain regulators such as:

(1) by the addition of a catalyst which changes the rate of reaction of hydroperoxide with the oxalate component or catalysts which alter the rate of reaction or the rate of chemiluminescence, such as those described in U.S. Pat. No. 3,775,366, U.S. Pat. No. 3,691,085 and U.S. Pat. No. 3,704,231;

or (2) by the variation of hydroperoxide. Both the type and the concentration of hydroperoxide are critical for the purposes of regulation.

In two component chemiluminescent systems of the type described, a catalyst is generally included as part of the hydrogen peroxide component. Among the catalysts tried, sodium salicylate and various tetraalkylammonium salicylates have been the most widely used.

Furthermore, lithium carboxylic acid salts and especially lithium salicylate, lithium 5-t-butyl salicylate and lithium 2-chlorobenzoate have been found to be excellent catalysts for low temperature hydrogen peroxide/oxalate ester fluorescer chemiluminescent systems. Compounds which are generally suitable to catalyze the reaction between the activator and oxalate type esters are basic compounds, such as amines, hydroxides, alkoxides, carboxylic acid salts and phenolic salts. Preferred salts of carboxylic acids and phenols are derived from compounds having a pKa in the range of from about 1 to about 6 as measured in aqueous solution, for example tetrabutylammonium salicylate and sodium salicylate. In accordance with the instant invention, especially preferred are those catalysts containing equimolar amounts of sodium perborate and salicylic acid. Effective amounts of catalyst concentration are generally in the range of 0.001 weight percent to 0.6 weight percent.

In general, any oxalate type ester chemiluminescent system may be employed in the present invention. Such systems are composed of mixtures of effective amounts of an oxalate type ester, a peroxide activator, a fluorescent compound to control the frequency of light emitted as a result of the reaction between the ester and the peroxide, a catalyst to accelerate the reaction and a solvent or mixture of solvents in which the constituents are dissolved or suspended.

Effective concentrations of the oxalate esters for use in the chemiluminescent systems of the present invention are in the range of 0.05 weight percent–30 weight percent. Suitable oxalate type esters includes for example, those represented by the following formula:

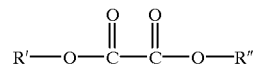

wherein R' and R" are one or different members selected from the group consisting of:

I. Aryl groups: e.g., phenyl-, naphthyl-, and substituted aryl, typical substituents being: halo, such as, chloro, bromo or iodo; acyloxy, such as, benzoyloxy; carbonyl, such as, formyl or acetyl; and carboxyl, such as, carboxy, sulfo;

II. Heterocyclic groups: e.g., pyridyl-, acridinyl-, and substituted heterocyclic groups, typical substituents being: alkyl, such as, methyl, ethyl or octyl; halo, such as, chloro, bromo or iodo; acyloxy, such as acetoxy carbonyl such as formyl; carboxyl such as carboxy; alkoxy, such as, methoxy; amino, such as, triethylammonium; and, sulfo;

III. Unsaturated alkyl groups: e.g., vinyl-, ethynyl-, cyclo-, hexenyl-, isopropenyl-, and substituted derivatives thereof, typical substituents being halo, phenyl, cyano, carboxy groups, and the like;

IV. Electronegatively substituted groups: e.g., 1,1,1,3,3,3,-hexafluoro-2-propyl-,1,1,1,3,3,3,-hexachloro-2-cyano-2-propyl-, perfluoro-t-butyl-, dicyanomethyl-, trimethyl-, ammonium-methyl-.

The oxalates of the following general formula are useful in the practice of the present invention:

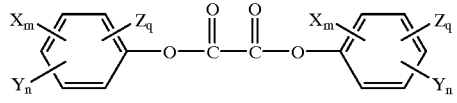

where: X represents one or more electronegative substituents, i.e., one having a Hammett sigma constant greater than zero, as previously defined, Y represents a carbalkoxy group, having $C_1$–$C_{12}$ $C_{1-5}$ being preferred, Z represents a hydrogen, alkyl or alkoxyalkyl group having $C_1$–$C_{12}$ hydrocarbon chains, $C_{1-5}$ being preferred, m, n and q are integers such that the combined Hammett sigma constant of the X, Y and Z substituents on each phenyl group is at least about 1.4 to 2.7. In the above, each of m and n is always at least one, q is 0, 1, 2 or 3.

Xm may represent several different electronegative substituents. Moreover, the aryl oxalate may be additionally substituted by such non-electronegative substituents as alkyl and para-alkoxy, provided only that the sigma sum of all the substituents is at least about 1.4 to 2.7.

Among the especially preferred oxalates, one may mention, for example: bis (2-carbalkoxy-3,4,6-trichlorophenyl) oxalate, e.g., the 2-carbobutoxy and 2-carbopentoxy compounds, bis (3-carbalkoxy-2,4,6-trichlorophenyl) oxalate, bis(4-carbalkoxy-2,3,6-trichlorophenyl)oxalate, bis(3,5-dicarbalkoxy-2,4,6-trichlorophenyl oxalate. Bis(2,3-dicarbalkoxy-4,5,6 trichlorophenyl)oxalate, bis (2,4-dicarbalkoxy-3,5,6-trichlorophenyl) oxalate, bis (2,5-dicarbalkoxy-3,4,6-trichlorophenyl)oxalate, bis(2,6-dicarbalkoxy-3,4,5-trichlorophenyl) oxalate, bis(3-carbalkoxy-2,4,5,6-tetrachlorophenyl)oxalate, bis (2-carbalkoxy-3,4,5,6-tetrachlorophenyl)oxalate, bis(4-carbalkoxy-2,3,5,6-tetrachlorophenyl) oxalate, bis(6-carbalkoxy-2,3,4-trichlorophenyl) oxalate, bis(2,3,-dicarbalkoxy-4,6-dichlorophenyl)oxalate, bis(3,6-dicarbalkoxy-2,4-dichlorophenyl)oxalate, bis(2,3,5-tricarbalkoxy-4,6-dichlorophenyl)oxalate, bis(3,4,5-tricarbalkoxy-2,6-dichlorophenyl)oxalate, bis(2,4,6-tricarbalkoxy-3,5-dichlorophenyl)oxalate, bis(3-bromo-6-carbohexoxy-2,4,5-trichlorophenyl)oxalate, bis(bis(3-bromo-2-carbethoxy-4,6-dichlorophenyl)oxalate, bis(2-carbethoxy4,6-dichloro-3-nitrophenyl)oxalate, bis [2-carbomethoxy-4,6-dichloro-3-(trifluoromethyl)phenyl] oxalate,bis(2-carbobutoxy-46-dichloro-3-cyanophenyl)oxalate, bis(2-carboctyloxy-4,5,6-trichloro-3-ethoxyphenyl)oxalate, bis(2-carbobutoxy-3,4,6-trichloro-5-ethoxphenyl) oxalate, bis(2-carbisopropoxy-3,4,6-trichloro-5-methylphenyl)oxalate, bis(2-carbisopropoxy-4,6-dichloro-5 octylphenyl) oxalate, bis[2-carbomethoxy-3,5,6-trichloro-4-(1,1,3,3-tetramethylbutyl)-phenyl] oxalate, bis{2-[carbobis(trifluoromethyl) methoxy]-3,4,5,6-tetrafluorophenyl} oxalate, bis(3,4,6-tribromo-2-carbocyclohexoxyphenyl)oxalate,bis(2,4,5-tribromo-6-carbophenoxy-3-hexadecylphenyl)oxalate, bis(2,4,5-trichloro- 6-carbobutoxyphenyl)oxalate and bis (2,4,5-trichloro-6-carbopentoxyphenyl)oxalate.

The activator is typically a peroxide which is reactive with the oxalate type ester, such as, hydrogen peroxide.

Any solvent in which the other constituents are stable and soluble or suspendable are generally suitable for use as an oxalate solvent in the present invention. A wide variety of organic solvents and mixtures thereof are suitable, such as, for example: carboxylic acid esters, such as ethyl acetate, ethyl benzoate, dimethyl phthalate, dibutyl phthalate, dioctyl phthalate, methyl formate, triacetin, diethyl oxalate, and dioctyl terphthalate; aromatic hydrocarbons, such as benzene, and lower alkyl benzenes, such as toluene, ethyl benzene, and butylbenzene; chlorinated hydrocarbons, such as chlorobenzene, o-dichlorobenzene, m-dichlorobenzene, chloroform, carbon tetrachloride, hexachloroethane, and tetrachlorotetrafluoropropane.

Further solvents which are useful include salicylate esters, citrate esters, benzoates, mellitates, acetates, amides and alkyl aryl phosphates. Specifically, tributyl trimellitate, trihexyl trimellitate, benzyl benzoate, butyl benzoate, benzyl acetate, N,N-Diethyl toluamide, N,N-Diethyl Benzamide, -Butyl Tri-n-hexyl citrate, Ethyl 2-Acetoxy Salicylate, and diisobutyl adipate are especially useful.

In general, any fluorescent compound which is stable in the presence of the activator and the oxalate type ester and which has a spectral emission falling between about 330 millimicrons and 1200 millimicrons and which is at least partially soluble in the solvent selected is suitable for use in the present invention. Suitable fluorescers include, for example, polycyclic aromatic compounds having at least three fused rings, such as anthracene, substituted anthracene, benzanthracene, phenanthrene, substituted phenanthrene, napthacene, substituted naphthacene, pentacene, substituted pentacene, perylene, substituted perylene, and the like. Typical substituents for all of these are phenyl, lower alkyl ($C_1$–$C_6$), chloro, bromo, cyano, alkoxy ($C_1$–$C_{16}$), and other like substituents which do not interfere with the light generating reaction contemplated therein.

EXAMPLES

As described in Table 1, a 6" green LIGHTSTICK was utilized as a representative chemiluminescent system. The control utilized dimethyl phthalate (DMP)as the activator solvent and included a sodium salicylate catalyst.

In accordance with the instant invention, a second embodiment was formulated using a high purity triethyl citrate as the activator solvent that contained no more than 0.05 weight percent of unreacted acid, was substantially free of carbon double-bond compounds and contained a sodium salicylate catalyst.

Further in accordance with the instant invention, a third embodiment was formulated containing the same high purity triethyl citrate (TEC) as the activator solvent and an equimolar blend of sodium perborate and salicylic acid as the catalyst.

Light output was measured in LUX and was calculated at 15 minutes subsequent to activation and then at hourly intervals from the time of activation.

The results demonstrate that the triethyl citrate activator displays a "flatter" light output curve than the same system formed with a DMP activator solvent. Although the initial output of the TEC system is lower and the decrease in intensity is less steep, overall light output from 15 minutes to 12 hours totals 111% of the DMP system. Furthermore, the initial "burst" of light generated by the TEC system is less than half of the DMP system. Since significant amounts of available chemical energy are not consumed in this initial burst, a great deal more is available during hours 6–12, in fact, 161% more light output is realized during hours 6 thru 12 than with the DMP system.

These effects are further intensified by incorporating the new catalyst system as set forth in the third embodiment. By replacing the catalyst system with a sodium perborate/salicylic acid blend of equimolar proportions, the total light output of the TEC system is 118% of the DMP and in the last six hours, light output of the TEC system is 383% of the DMP system.

For various industries, such as the fishing and safety illumination industries, this represents a significant improvement, since these industries have long requested a LIGHTSTICK which operates like a light bulb in that you turn it on, it glows with a relatively constant intensity and then goes off.

TABLE 1

| | 15 Min | 1 Hour | 2 Hour | 3 Hour | 4 Hour | 5 Hour | 6 Hour | 7 Hour | 8 Hour | 9 Hour | 10 Hour | 11 Hour | 12 Hour | HOURS TLOP | 1–12 % | HOURS TLOP | 6–12 % |
|---|---|---|---|---|---|---|---|---|---|---|---|---|---|---|---|---|---|
| DMP/ NaSal | 39.3 | 25.8 | 14 | 9.12 | 5.69 | 3.77 | 2.56 | 1.81 | 1.43 | 1.15 | 0.65 | 0.69 | 0.45 | 67.43 | 100 | 9.05 | 100 |
| TEC/ NaSal | 26.8 | 23.6 | 15.2 | 10.1 | 8.54 | 4.65 | 3.63 | 2.79 | 2.23 | 1.84 | 1.52 | 1.33 | 1.22 | 74.65 | 111 | 14.56 | 161 |
| TEC/ Perborate | 8.75 | 8.61 | 9.41 | 9.77 | 9 | 8.18 | 7.37 | 6.14 | 5.47 | 4.72 | 4.06 | 2.7 | 3.18 | 79.50 | 118 | 34.62 | 383 |

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

What is claimed is:

1. In a chemiluminescent composition for enhanced generation of chemiluminescent light, including:
    an effective amount of an activator component characterized as a solution of an activator compound and dimethyl phthalate;
    an effective amount of an oxalate component characterized as a solution of an oxalic acid ester and a diluent; and
    an effective amount of a fluorescer compound;
    the improvement comprising an effective amount of a catalyst system including an equimolar mixture of sodium perborate and salicylic acid;
    said components, compounds and system being sufficiently pure to provide enhanced generation of chemiluminescent lights
    wherein said composition exhibits a flatter light output profile.

2. The improved chemiluminescent composition of claim 1 wherein said dimethyl phthalate is characterized as containing less than 0.05 weight percent unreacted phthalic acid and being free of any neutralization salt residues or other phthalate compounds.

3. The improved chemiluminescent composition of claim 1 wherein said diluent is selected from the group consisting of salicylates, citrates, phthalates, benzoates, mellitates, acetates, amides, alkyl aryl phosphates, an adipate and mixtures thereof.

4. The improved chemiluminescent composition of claim 3 wherein said diluent is selected from the group consisting of tributyl trimellitate, trihexyl trimellitate, benzyl benzoate, butyl benzoate, benzyl acetate, n,n-diethyl toluamide, n,n-diethyl benzamide, n-butyl,tri-n-hexyl citrate, ethyl-2-acetoxy salicylate, dibutyl phthalate, diisobutyl adipate and mixtures thereof.

5. The improved chemiluminescent composition of claim 1 wherein said activator compound is a hydrogen peroxide compound.

6. An improved chemiluminescent composition for enhanced generation of chemiluminescent light, said composition exhibiting a flatter light output profile and greater total light output comprising:
    an effective amount of an activator component characterized as a solution of an activator compound and a triethyl citrate produced by the process of heating an ethanol and citric acid in the presence of an organic titanate at a temperature of approximately 140° C. to effect esterification, removing the excess alcohol, and alkoxylating the ester by adding sulfuric acid and an appropriate anhydride while maintaining the temperature below approximately 110° C. until the alkoxylation reaction is complete to obtain said citrate ester;
    an effective amount of an oxalate component characterized as a solution of an oxalic acid ester and a diluent;
    an effective amount of a fluorescer compound; and
    an effective amount of a catalyst system;
    said components, compounds and system being sufficiently pure to provide enhanced generation of chemiluminescent light.

7. The improved chemiluminescent composition of claim 6 wherein said diluent is selected from the group consisting of salicylates, citrates, phthalates, benzoates, mellitates, acetates, amides, alkyl aryl phosphates, an adipate and mixtures thereof.

8. The improved chemiluminescent composition of claim 7 wherein said diluent is selected from the group consisting of tributyl trimellitate, trihexyl trimellitate, benzyl benzoate, butyl benzoate, benzyl acetate, n,n-diethyl toluamide, n,n-diethyl benzamide, n-butyl,tri-n-hexyl citrate, ethyl-2-acetoxy salicylate, dibutyl phthalate, diisobutyl adipate and mixtures thereof.

9. The improved chemiluminescent composition of claim 6 wherein said diluent is dibutyl phthalate.

10. The improved chemiluminescent composition of claim 6 wherein said diluent is butyl benzoate.

11. The improved chemiluminescent composition of claim 6 wherein said catalyst system is an equimolar mixture of sodium perborate and salicylic acid.

12. The improved chemiluminescent composition of claim 6 wherein the activator compound is a hydrogen peroxide compound.

13. An improved phthalate-free chemiluminescent composition for enhanced generation of chemiluminescent light, said composition exhibiting a flatter light output profile and greater total light output comprising:
    an effective amount of an activator component characterized as a solution of an activator compound and a triethyl citrate produced by the process of heating an ethanol and citric acid in the presence of an organic titanate at a temperature of approximately 140° C. to effect esterification, removing the excess alcohol, and alkoxylating the ester by adding sulfuric acid and an appropriate anhydride while maintaining the temperature below approximately 110° C. until the alkoxylation reaction is complete to obtain said citrate ester;
    an effective amount of an oxalate component characterized as a solution of an oxalic acid ester and a diluent;
    an effective amount of a fluorescer compound; and
    a catalyst system;
    said components, compounds and system being sufficiently pure to provide enhanced generation of chemiluminescent light.

14. The improved chemiluminescent composition of claim 13 wherein said diluent is selected from the group consisting of salicylates, citrates, benzoates, mellitates, acetates, amides, alkyl aryl phosphates, an adipate and mixtures thereof.

15. The improved chemiluminescent composition of claim 14 wherein said diluent is selected from the group consisting of tributyl trimellitate, trihexyl trimellitate, benzyl benzoate, butyl benzoate, benzyl acetate, n,n-diethyl toluamide, n,n-diethyl benzamide, n-butyl,tri-n-hexyl citrate, ethyl-2-acetoxy salicylate, diisobutyl adipate and mixtures thereof.

16. The improved phthalate-free chemiluminescent composition of claim 13 wherein said diluent is butyl benzoate.

17. The improved phthalate-free chemiluminescent composition of claim 13 wherein said catalyst system is an equimolar mixture of sodium perborate and salicylic acid.

18. The improved phthalate-free chemiluminescent composition of claim 13 wherein the activator compound is a hydrogen peroxide compound.

19. In a process for producing light from a chemiluminescent lighting system, said lighting system comprising a mixture of effective amounts of an activator component, an oxalate component, a fluorescer compound and a catalyst system, the improvement comprising forming said activator component by dissolving an activator compound in a triethyl citrate solvent produced by the process of heating an ethanol and citric acid in the presence of an organic titanate at a temperature of approximately 140° C. to effect esterification, removing the excess alcohol, and alkoxylating the ester by adding sulfuric acid and an appropriate anhydride while maintaining the temperature below approximately 110° C. until the alkoxylation reaction is complete to obtain said citrate ester;

whereby the total output of light from said chemiluminescent system is increased.

20. The process of claim 19 wherein said oxalate component is characterized as containing a diluent selected from the group consisting of salicylates, citrates, phthalates, benzoates, mellitates, acetates, amides, alkyl aryl phosphates, an adipate and mixtures thereof.

21. The process of claim 20 wherein said oxalate component is characterized as containing a diluent selected from the group consisting of tributyl trimellitate, trihexyl trimellitate, benzyl benzoate, butyl benzoate, benzyl acetate, n,n-diethyl toluamide, n,n-diethyl benzamide, -butyl,tri-n-hexyl citrate, ethyl-2-acetoxy salicylate, dibutyl phthalate, diisobutyl adipate and mixtures thereof.

22. The process of claim 19 wherein said oxalate component is characterized as containing a dibutyl phthalate diluent.

23. The process of claim 19 characterized as containing a butyl benzoate diluent.

24. The process of claim 19 wherein said catalyst system is an equimolar mixture of sodium perborate and salicylic acid.

25. The process of claim 19 wherein the activator compound is a hydrogen peroxide compound.

26. A process for flattening the light output profile of a chemiluminescent lighting system, said lighting system comprising a mixture of effective amounts of an activator component, an oxalate component, a fluorescer compound and a catalyst system, which process comprises forming said activator component by dissolving an activator compound in a triethyl citrate solvent produced by the process of heating an ethanol and citric acid in the presence of an organic titanate at a temperature of approximately 140° C. to effect esterification, removing the excess alcohol, and alkoxylating the ester by adding sulfuric acid and an appropriate anhydride while maintaining the temperature below approximately 110° C. until the alkoxylation reaction is complete to obtain said citrate ester;

whereby the light output profile of said chemiluminescent lighting system is flattened.

27. The process of claim 26 wherein said oxalate component is characterized as containing a diluent selected from the group consisting of salicylates, citrates, phthalates, benzoates, mellitates, acetates, amides, alkyl aryl phosphates, an adipate and mixtures thereof.

28. The process of claim 27 wherein said oxalate component is characterized as containing a diluent selected from the group consisting of tributyl trimellitate, trihexyl trimellitate, benzyl benzoate, butyl benzoate, benzyl acetate, n,n-diethyl toluamide, n,n-diethyl benzamide, -butyl,tri-n-hexyl citrate, ethyl-2-acetoxy salicylate, dibutyl phthalate, diisobutyl adipate and mixtures thereof.

29. The process of claim 26 wherein said oxalate component is characterized as containing a dibutyl phthalate diluent.

30. The process of claim 26 wherein said oxalate component is characterized as containing a diluent which is phthalate free.

31. The process of claim 26 wherein said oxalate component is characterized as containing a butyl benzoate diluent.

32. The process of claim 26 wherein said catalyst system is an equimolar mixture of sodium perborate and salicylic acid.

33. The process of claim 26 wherein the activator compound is a hydrogen peroxide compound.

34. In a method for producing chemical light having the steps of bringing a hydrogen peroxide component dissolved in a solvent, a catalyst system, an oxalate ester solution and a fluorescer compound together and allowing said components, system and compounds to react to produce said light, the improvement comprising utilizing a triethyl citrate produced by the process of heating an ethanol and citric acid in the presence of an organic titanate at a temperature of approximately 140° C. to effect esterification, removing the excess alcohol, and alkoxylating the ester by adding sulfuric acid and an appropriate anhydride while maintaining the temperature below approximately 110° C. until the alkoxylation reaction is complete to obtain said citrate ester; as said solvent;

whereby enhanced generation of chemiluminescent light is manifested by a flatter light output profile and greater total light output.

35. The method of claim 34 further characterized by said triethyl citrate being substantially free of carbon double-bond compounds.

36. The method of claim 34 further characterized by said catalyst containing an equimolar mixture of sodium perborate and salicylic acid.

37. The method of claim 34 wherein said oxalate component is characterized as containing a diluent selected from the group consisting of salicylates, citrates, phthalates, benzoates, mellitates, acetates, amides, alkyl aryl phosphates an adipate and mixtures thereof.

38. The method of claim 37 wherein said oxalate component is characterized as containing a diluent selected from the group consisting of tributyl trimellitate, trihexyl trimellitate, benzyl benzoate, butyl benzoate, benzyl acetate, n,n-diethyl toluamide, n,n-diethyl benzamide, -butyl,tri-n-hexyl citrate, ethyl-2-acetoxy salicylate, dibutyl phthalate, diisobutyl adipate and mixtures thereof.

39. In a process for producing light from a chemiluminescent lighting system, said lighting system comprising a mixture of effective amounts of an activator component, an oxalate component, and a fluorescer compound, the improvement comprising providing a catalyst system characterized as containing an equimolar mixture of sodium perborate and salicylic acid;

whereby the total output of light from said chemiluminescent lighting system is increased.

40. The process of claim 39 wherein said oxalate component is characterized as containing a diluent selected from the group consisting of salicylates, citrates, phthalates, benzoates, mellitates, acetates, amides, alkyl aryl phosphates, an adipate and mixtures thereof.

41. The process of claim 40 wherein said oxalate component is characterized as containing a diluent selected from the group consisting of tributyl trimellitate, trihexyl trimellitate, benzyl benzoate, butyl benzoate, benzyl acetate, n,n-diethyl toluamide, n,n-diethyl benzamide, -butyl,tri-n-hexyl citrate, ethyl-2-acetoxy salicylate, dibutyl phthalate, diisobutyl adipate and mixtures thereof.

42. The process of claim 39 wherein said oxalate component is characterized as containing a dibutyl phthalate diluent.

43. The process of claim 39 wherein said oxalate component is characterized as containing a butyl benzoate diluent.

44. The process of claim 39 wherein the activator compound is a hydrogen peroxide compound.

45. In a process for flattening the light output profile of a chemiluminescent lighting system, said lighting system comprising a mixture of effective amounts of an activator component, an oxalate component, and a fluorescer compound, the improvement comprising providing a catalyst system characterized as containing an equimolar mixture of sodium perborate and salicylic acid;

whereby the light output profile of said chemiluminescent lighting system is flattened.

46. The process of claim 45 wherein said oxalate component is characterized as containing a diluent selected from the group consisting of salicylates, citrates, phthalates, benzoates, mellitates, acetates, amides, alkyl aryl phosphates, an adipate and mixtures thereof.

47. The process of claim 46 wherein said oxalate component is characterized as containing a diluent selected from the group consisting of tributyl trimellitate, trihexyl trimellitate, benzyl benzoate, butyl benzoate, benzyl acetate, n,n-diethyl toluamide, n,n-diethyl benzamide, -butyl,tri-n-hexyl citrate, ethyl-2-acetoxy salicylate, dibutyl phthalate, diisobutyl adipate and mixtures thereof.

48. The process of claim 45 wherein said oxalate component is characterized as containing a dibutyl phthalate diluent.

49. The process of claim 45 wherein said oxalate component is characterized as containing a butyl benzoate diluent.

50. The process of claim 45 wherein the activator compound is a hydrogen peroxide compound.

* * * * *